(12) United States Patent
Khan

(10) Patent No.: US 7,989,150 B2
(45) Date of Patent: Aug. 2, 2011

(54) MANUFACTURING METHOD OF OPTICAL WAVEGUIDE

(75) Inventor: Sazzadur Rahman Khan, Osaka (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 716 days.

(21) Appl. No.: 12/133,629

(22) Filed: Jun. 5, 2008

(65) Prior Publication Data

US 2008/0305439 A1    Dec. 11, 2008

Related U.S. Application Data

(60) Provisional application No. 60/954,714, filed on Aug. 8, 2007.

(30) Foreign Application Priority Data

Jun. 7, 2007  (JP) ................................. 2007-151718
May 13, 2008  (JP) ................................. 2008-125844

(51) Int. Cl.
*G03F 7/20* (2006.01)

(52) U.S. Cl. ........................................ 430/321

(58) Field of Classification Search ........................ None
See application file for complete search history.

(56) References Cited

U.S. PATENT DOCUMENTS

| | | | |
|---|---|---|---|
| 5,991,489 | A | 11/1999 | Kondo |
| 6,438,281 | B1 | 8/2002 | Tsukamoto et al. |
| 6,547,976 | B2 | 4/2003 | Beguin |
| 7,215,862 | B2 | 5/2007 | Naitou et al. |
| 7,236,675 | B2 | 6/2007 | Naitou et al. |
| 2002/0074308 | A1 | 6/2002 | Beguin |
| 2004/0022499 | A1 | 2/2004 | Shimizu et al. |
| 2006/0204196 | A1 | 9/2006 | Naitou et al. |
| 2008/0075405 | A1 | 3/2008 | Wang et al. |

FOREIGN PATENT DOCUMENTS

| | | |
|---|---|---|
| CN | 101589319 A | 11/2009 |
| EP | 0 851 244 A1 | 7/1998 |
| EP | 1 041 418 A2 | 10/2000 |
| EP | 1 122 561 A1 | 8/2001 |
| EP | 1 701 188 A1 | 9/2006 |
| JP | 050249334 * | 9/1993 |
| JP | 2005-173039 A | 6/2005 |
| WO | 2008/036726 A2 | 3/2008 |
| WO | WO 2008/036726 A2 | 3/2008 |

OTHER PUBLICATIONS

Chinese Office Action dated Jun. 9, 2010, issued in corresponding Chinese Patent Application No. 200810168679.
European Search Report dated Aug. 26, 2008, issued in corresponding European Patent Application No. 08 00 9860.

* cited by examiner

*Primary Examiner* — Kathleen Duda
*Assistant Examiner* — Anna L Verderame
(74) *Attorney, Agent, or Firm* — Westerman, Hattori, Daniels & Adrian, LLP

(57) ABSTRACT

An optical waveguide production method for producing an optical waveguide comprising the steps of: forming an under-cladding layer and an alignment mark from the same material on a substrate; forming a thin metal film on the alignment mark; forming a first transparent photosensitive resin layer on the resultant substrate to cover the under-cladding layer and the thin metal film; positioning an exposure mask with reference to the thin metal film formed on the alignment mark; and selectively exposing a predetermined portion of the first photosensitive resin layer on the under-cladding layer via the exposure mask to form a core defined by the exposed portion of the first photosensitive resin layer.

6 Claims, 4 Drawing Sheets

MANUFACTURING METHOD OF OPTICAL WAVEGUIDE

RELATED APPLICATIONS

This application claims the benefit of U.S. Provisional Application No. 60/954,714, filed on Aug. 8, 2007, which is hereby incorporated by reference.

BACKGROUND OF THE INVENTION

1. Field of the Invention

The present invention relates to a method for producing an optical waveguide which is widely used for optical communications, optical information processing and other general optics.

2. Description of the Related Art

Optical waveguides are incorporated in optical devices such as optical waveguide devices, optical integrated circuits and optical interconnection boards, and are widely used in the fields of optical communications, optical information processing and other general optics. Such an optical waveguide typically includes a core having a predetermined pattern and serving as a light passage, and an under-cladding layer and an over-cladding layer which cover the core (see, for example, JP-A-2005-173039). For production of the optical waveguide, the under-cladding layer, the core and the over-cladding layer are typically formed in this order in stacked relation on a substrate.

Photosensitive resins are typically used as materials for forming the under-cladding layer, the core and the over-cladding layer in predetermined patterns. For patterning each of the photosensitive resins, an exposure mask formed with an opening pattern corresponding to the predetermined pattern is positioned on the photosensitive resin, which is in turn exposed to radiation via the exposure mask. An unexposed portion of the photosensitive resin is dissolved away, whereby an exposed portion of the photosensitive resin has the predetermined pattern.

The positioning of the exposure mask is typically achieved by means of an optical sensor or the like with reference to an alignment mark formed on the substrate. Meanwhile, an optical waveguide device including a light emitting element embedded in its optical waveguide is now under consideration. In the optical waveguide device, the core and the over-cladding layer tend to have an increased thickness as compared with the conventional optical waveguide. In this case, it is difficult to visually or optically detect the alignment mark on the substrate in the positioning of the exposure mask, thereby reducing the positioning accuracy. Particularly, where the alignment mark and the under-cladding layer are formed of the same transparent material, it is more difficult to visually or optically detect the alignment mark.

SUMMARY OF THE INVENTION

In view of the foregoing, it is an object of the present invention to provide an optical waveguide production method which facilitates visual or optical detection of an alignment mark.

To achieve the aforementioned object, an inventive optical waveguide production method comprises the steps of: forming an under-cladding layer and an alignment mark from the same material on a substrate; forming a thin metal film on the alignment mark; forming a first transparent photosensitive resin layer on the resultant substrate to cover the under-cladding layer and the thin metal film; positioning an exposure mask with reference to the thin metal film formed on the alignment mark; and selectively exposing a predetermined portion of the first photosensitive resin layer on the under-cladding layer via the exposure mask to form a core defined by the exposed portion of the first photosensitive resin layer}.

In the present invention, the term "alignment mark" means a mark which is used as a reference for positioning the exposure mask.

In the inventive optical waveguide production method, the thin metal film is formed on the alignment mark formed on the substrate prior to the formation of the transparent photosensitive resin layer. Therefore, it is easy to detect the alignment mark (formed with the thin metal film) through the photosensitive resin layer. This facilitates the positioning of the exposure mask for the formation of the core, thereby improving the positioning accuracy. As a result, an optical waveguide can be provided which is excellent in the dimensional accuracy of the core.

The optical waveguide production method further comprises the steps of: forming a second transparent photosensitive resin layer on the resultant substrate to cover the under-cladding layer, the thin metal film and the core after the formation of the core; positioning an over-cladding layer formation exposure mask with reference to the thin metal film formed on the alignment mark; and selectively exposing a predetermined portion of the second photosensitive resin layer on the under-cladding layer via the over-cladding layer formation exposure mask to form an over-cladding layer defined by the exposed portion of the second photosensitive resin layer. In this case, the positioning of the over-cladding layer formation exposure mask is facilitated, so that the optical waveguide is excellent in the dimensional accuracy of the over-cladding layer.

Particularly, where the thin metal film is formed of silver, the thin metal film firmly adheres to the alignment mark formed of the same material as the under-cladding layer. Therefore, the exposure mask is more reliably positioned without separation of the thin metal film of silver in the production of the optical waveguide.

In addition, even if the first photosensitive resin layer for the formation of the core has a thickness not less than 20 μm and/or the second photosensitive resin layer for the formation of the over-cladding layer has a thickness not less than 20 μm, the alignment mark (formed with the thin metal film) can be detected through the photosensitive resin layers.

Further, where the optical waveguide includes a light emitting element embedded therein, the core and the over-cladding layer each have a greater thickness. Even in this case, the alignment mark (formed with the thin metal film) can be detected through the photosensitive resin layers which are respectively formed into the core and the over-cladding layer.

In the present invention, the optical waveguide including the light emitting element is also intended to fall within the category of the optical waveguide.

DESCRIPTION OF THE PREFERRED EMBODIMENTS

Figure 1A:
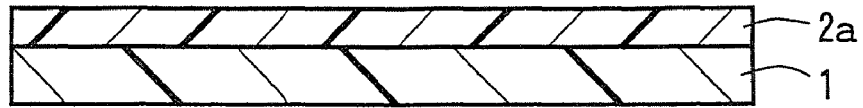
FIGS. 1(*a*) to 1(*c*) are explanatory diagrams schematically showing the step of forming an under-cladding layer and alignment marks in an optical waveguide production method according to one embodiment of the present invention, and FIG. 1(*d*) is an enlarged plan view illustrating the alignment mark.

Next, an embodiment of the present invention will be described with reference to the attached drawings.

FIGS. 1(a) to 1(d), FIGS. 2(a) to 2(d), FIGS. 3(a) to 3(c) and FIGS. 4(a) to 4(c)} show an optical waveguide production method according to one embodiment of the present invention. This embodiment has a feature such that, for production of an optical waveguide W (see FIG. 4(c)) including an under-cladding layer 2, a core 3 and an over-cladding layer 4 on a rectangular planar substrate 1, alignment marks A are formed from the same material as the under-cladding layer 2 at four corners on the substrate 1 when the under-cladding layer 2 is formed (see FIG. 1(c)), and then thin metal films B are respectively formed on the alignment marks A (see FIG. 2(c)).

That is, even if a photosensitive resin layer 3a for formation of the core 3 and a photosensitive resin layer 4a for formation of the over-cladding layer 4 are formed over the alignment marks A, the formation of the thin metal films B on the alignment marks A makes it easy to detect the alignment marks A (formed with the thin metal films B) through the photosensitive resin layers 3a, 4a. This facilitates the positioning of an exposure mask $M_2$ for the formation of the core 3 and the positioning of an exposure mask $M_3$ for the formation of the over-cladding layer 4.

More specifically, the inventive optical waveguide production method is implemented, for example, in the following manner.

As shown in FIGS. 1(a) to 1(d), an under-cladding layer 2 and alignment marks A are formed on a substrate 1. That is, the substrate 1 (see FIG. 1(a)) is first prepared. The substrate 1 is not particularly limited, but exemplary materials for the substrate 1 include glass, quartz, silicon, resins and metals. The thickness of the substrate 1 is not particularly limited, but is typically in the range of 20 µm to 5 mm.

Then, as shown in FIG. 1(a), a varnish prepared by dissolving a photosensitive resin in a solvent is applied as the material for the formation of the under-cladding layer 2 and the alignment marks A on the substrate 1. The application of the varnish is achieved, for example, by a spin coating method, a dipping method, a casting method, an injection method, an ink jet method or the like. Then, the varnish is dried by a heat treatment at 50° C. to 120° C. for 10 to 30 minutes. Thus, a photosensitive resin layer 2a for the formation of the under-cladding layer 2 and the alignment marks A is formed. The thickness of the photosensitive resin layer 2a is typically in the range of 5 µm to 50 µm.

Figure 1B:
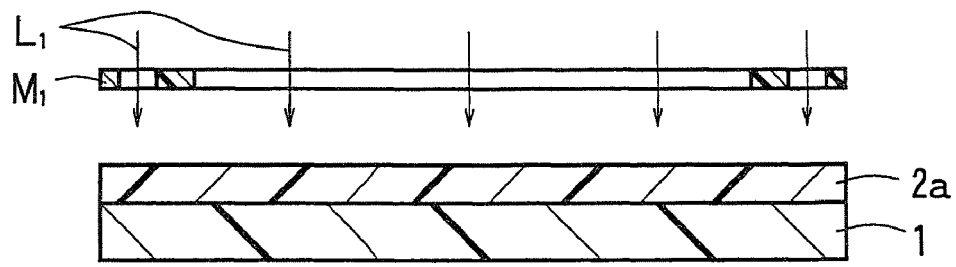

Subsequently, as shown in FIG. 1(b), an exposure mask $M_1$ formed with opening patterns corresponding to patterns of the under-cladding layer 2 and the alignment marks A is positioned above the photosensitive resin layer 2a, which is in turn exposed to radiation $L_1$ via the exposure mask $M_1$. Examples of the radiation $L_1$ for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 mJ/cm² to 10000 mJ/cm², preferably 50 mJ/cm² to 3000 mJ/cm².

After the exposure, a heat treatment is performed to complete a photoreaction. The heat treatment is performed at 80° C. to 250° C., preferably at 100° C. to 200° C., for 10 seconds to two hours, preferably for five minutes to one hour.

Figure 1C:
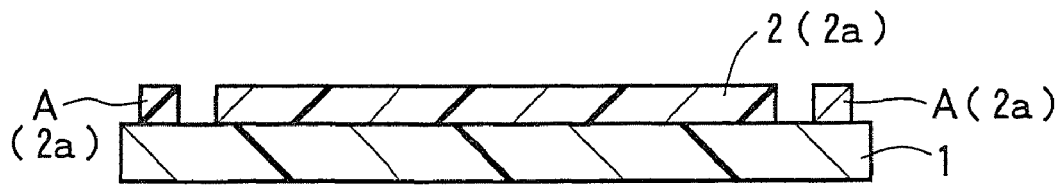
Figure 1D:
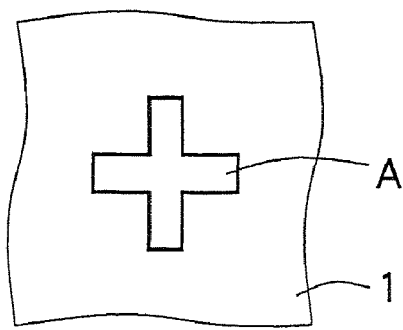

Subsequently, as shown in FIG. 1(c), a development process is performed by using a developing agent to dissolve away an unexposed portion of the photosensitive resin layer 2a. Thus, the patterns of the under-cladding layer 2 and the alignment marks A are formed, which are defined by the remaining portions of the photosensitive resin layer 2a. The pattern of each of the alignment marks A is not particularly limited, but typically has a cross shape as viewed in plan (see FIG. 1(d)). Exemplary methods for the development include an immersion method, a spray method and a puddle method. Examples of the developing agent include an organic solvent and an organic solvent containing an alkaline aqueous solution. The developing agent and conditions for the development are properly selected depending on the composition of the photosensitive resin.

After the development, the developing agent in the remaining portions of the photosensitive resin layer 2a having the patterns of the under-cladding layer 2 and the alignment marks A is removed by a heat treatment. The heat treatment is typically performed at 80° C. to 120° C. for 10 to 30 minutes. Thus, the remaining portions of the photosensitive resin layer 2a having the patterns of the under-cladding layer 2 and the alignment marks A respectively serve as the under-cladding layer 2 and the alignment marks A.

Figure 2A:
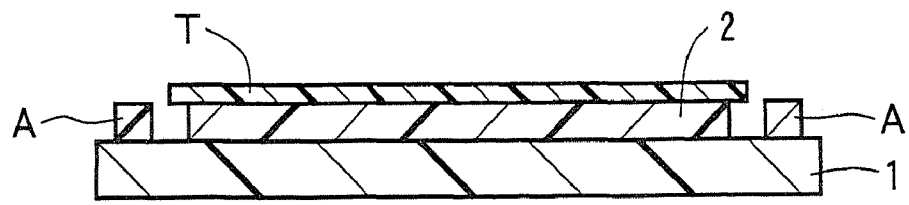
FIGS. 2(*a*) to 2(*c*) are explanatory diagrams schematically showing the step of forming thin metal films on the alignment marks in the optical waveguide production method according to an embodiment of the present invention.
FIG. 2(d) is an enlarged plan view illustrating the thin metal film on the alignment mark.
Figure 2B:
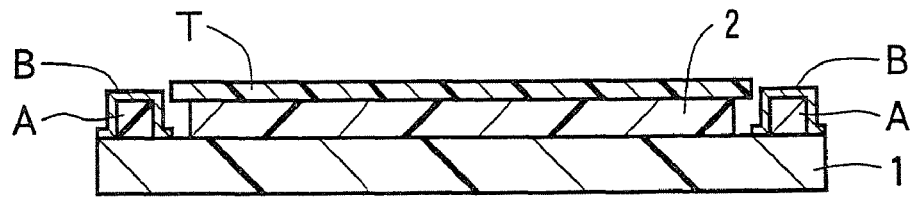
Figure 2C:
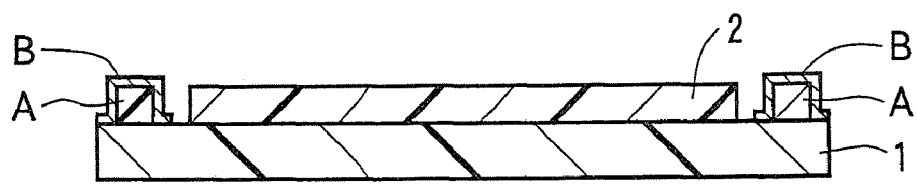
Figure 2D:
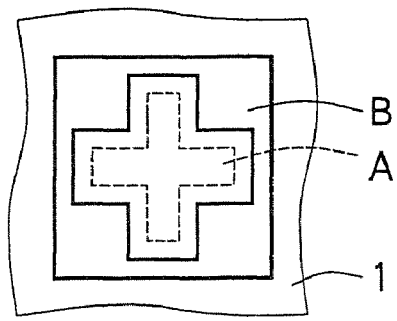

In the present invention, as shown in FIGS. 2(a) to 2(d), thin metal films B are respectively formed on the alignment marks A after the aforementioned process. This is a major feature of the present invention. That is, as shown in FIG. 2(a), a portion of the resultant substrate excluding the alignment marks A and their peripheries is masked with a masking tape T and, in this state, the thin metal films B are formed on the alignment marks A, for example, by a vacuum vapor deposition method, a sputtering method or a plasma method as shown in FIG. 2(b). In this embodiment, the thin metal films B are formed as covering top surfaces as well as side surfaces of the alignment marks A and portions of the substrate 1 around the alignment marks A (see FIG. 2(d)). Thereafter, as shown in FIG. 2(c), the masking tape T is removed. Exemplary materials for the thin metal films B include silver, aluminum, nickel, chromium and copper, and alloy materials including two or more of these elements, among which silver is preferred because it firmly adheres to the alignment marks A and the substrate 1. The thickness of the thin metal films B is not particularly limited, but is preferably in the range of 100 nm to 500 nm.

Figure 3A:
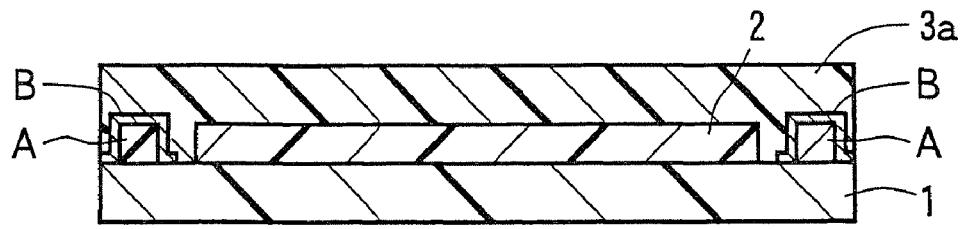
FIGS. 3(a) to 3(c) are explanatory diagrams schematically showing the step of forming a core in the optical waveguide production method according to an embodiment of the present invention.
Figure 3B:
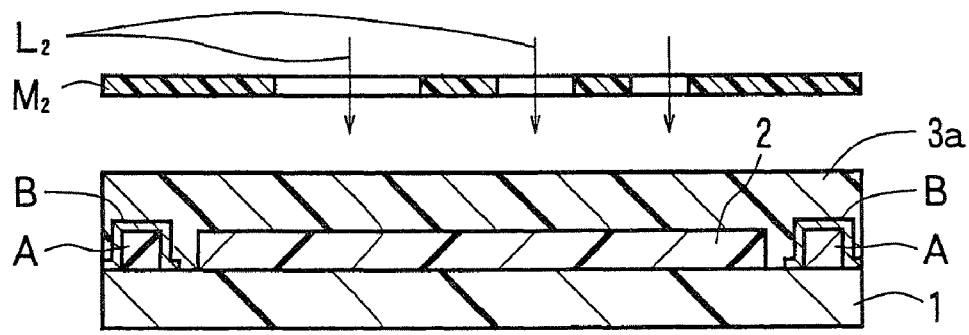
Figure 3C:
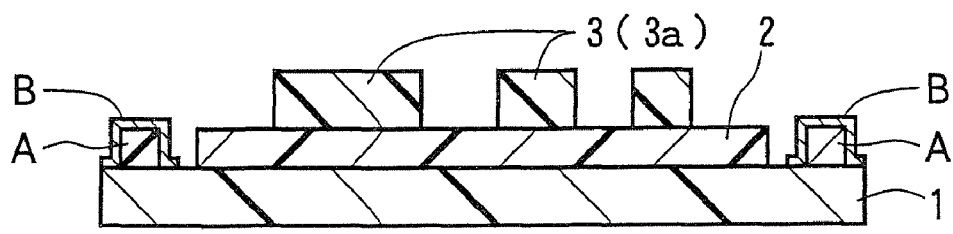

In turn, as shown in FIGS. 3(a) to 3(c), a core 3 is formed on the under-cladding layer 2. That is, as shown in FIG. 3(a), a first transparent photosensitive resin layer 3a for the formation of the core 3 (see FIG. 3(c)) is first formed on the resultant substrate 1 as covering the under-cladding layer 2 and the thin metal films B. The formation of the photosensitive resin layer 3a is achieved in the same manner as the formation of the photosensitive resin layer 2a for the under-cladding layer 2 described with reference to FIG. 1(a). The thickness of the photosensitive resin layer 3a (as measured on the under-cladding layer 2) is typically in the range of 5 µm to 50 µm. A material for the core 3 has a greater refractive index than the material for the under-cladding layer 2 and a material for an over-cladding layer 4 described later (see FIG. 4(c)). The refractive index may be adjusted, for example, by selection of the types of the materials for the under-cladding layer 2, the core 3 and the over-cladding layer 4 and adjustment of the composition ratio thereof.

Then, as shown in FIG. 3(b), an exposure mask $M_2$ formed with an opening pattern corresponding to a pattern of the core 3 (see FIG. 3(c)) is positioned above the photosensitive resin layer 3a. The positioning of the exposure mask $M_2$ for the formation of the core 3 is achieved with reference to the thin metal films 5 formed on the alignment marks A and detectable through the photosensitive resin layer 3a. The thin metal films B are detectable through the photosensitive resin layer 3a even if the photosensitive resin layer 3a has a thickness not less than 20 µm (as measured on the under-cladding layer 2). After the photosensitive resin layer 3a is (selectively and partly) exposed to radiation $L_2$ via the exposure mask $M_2$, a heat treatment is performed. The exposure and the heat treatment are performed in the same manner as in the formation of the under-cladding layer 2 described with reference to FIG. 1(b).

Subsequently, as shown in FIG. 3(c), a development process is performed by using a developing agent to dissolve away an unexposed portion of the photosensitive resin layer 3a. Thus, a portion of the photosensitive resin layer 3a remaining on the under-cladding layer 2 has the pattern of the core 3. Thereafter, the developing agent in the remaining portion of the photosensitive resin layer 3a is removed by a heat treatment. Thus, the core 3 is formed. The development process and the heat treatment are performed in the same manner as in the formation of the under-cladding layer 2 described with reference to FIG. 1(c).

Figure 4A:
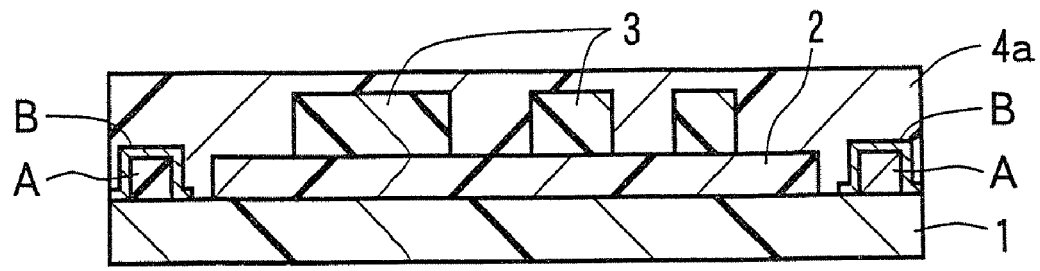
FIGS. 4(a) to 4(c) are explanatory diagrams schematically showing the step of forming an over-cladding layer in the optical waveguide production method according to an embodiment of the present invention.
Figure 4B:
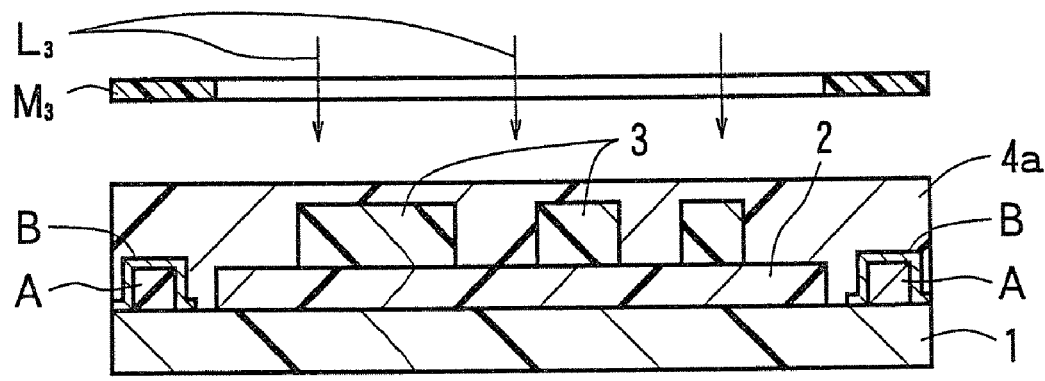
Figure 4C:
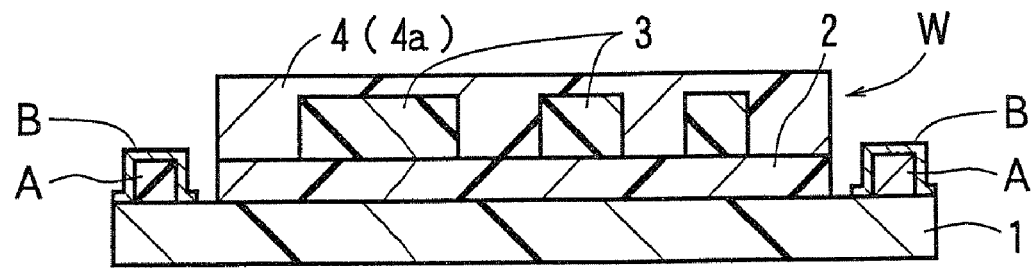

Then, as shown in FIGS. 4(a) to 4(c), an over-cladding layer 4 is formed on the under-cladding layer 2. That is, as shown in FIG. 4(a), a second transparent photosensitive resin layer 4a for formation of the over-cladding layer 4 (see FIG. 4(c)) is formed on the resultant substrate 1 as covering the under-cladding layer 2, the thin metal films B and the core 3. The formation of the photosensitive resin layer 4a is achieved in the same manner as the formation of the photosensitive resin layer 2a for the under-cladding layer 2 described with reference to FIG. 1(a). The thickness of the photosensitive resin layer 4a (as measured on the under-cladding layer 2) is typically in the range of 20 µm to 100 µm.

In turn, as shown in FIG. 4(b), an exposure mask $M_3$ formed with an opening pattern corresponding to a pattern of the over-cladding layer 4 (see FIG. 4(c)) is positioned above the photosensitive resin layer 4a. The positioning of the exposure mask $M_3$ for the formation of the over-cladding layer 4 is achieved with reference to the thin metal films B formed on the alignment marks A and detectable through the photosensitive resin layer 4a. The thin metal films B are detectable through the photosensitive resin layer 4a even if the photosensitive resin layer 4a has a thickness not less than 20 µm (as measured on the under-cladding layer 2). After the photosensitive resin layer 4a is (selectively and partly) exposed to radiation $L_3$ via the exposure mask $M_3$, a heat treatment is performed. The exposure and the heat treatment are performed in the same manner as in the formation of the under-cladding layer 2 described with reference to FIG. 1(b).

Subsequently, as shown in FIG. 4(c), a development process is performed by using a developing agent to dissolve away an unexposed portion of the photosensitive resin layer 4a. Thus, a portion of the photosensitive resin layer 4a remaining on the under-cladding layer 2 has the pattern of the over-cladding layer 4. Thereafter, the developing agent in the remaining portion of the photosensitive resin layer 4a is removed by a heat treatment. Thus, the over-cladding layer 4 is formed. The development process and the heat treatment are performed in the same manner as in the formation of the under-cladding layer 2 described with reference to FIG. 1(c).

In this manner, the optical waveguide W including the under-cladding layer 2, the core 3 and the over-cladding layer 4 is produced on the substrate 1. As required, the optical waveguide W is separated from the substrate 1.

Although the over-cladding layer 4 is provided in the embodiment described above, the over-cladding layer 4 is not essential. The optical waveguide may be configured without the provision of the over-cladding layer 4.

Next, an inventive example will be described in conjunction with a comparative example. However, the present invention is not limited to this example.

Example 1

Material for Formation of Under-Cladding Layer and Over-Cladding Layer

A material for formation of an under-cladding layer and an over-cladding layer was prepared by mixing 35 parts by weight of bisphenoxyethanolfluorene diglycidyl ether (Component A), 40 parts by weight of 3',4'-Epoxycyclohexylmethyl-3,4-Epoxycyclohexane carboxylate which is an alicyclic epoxy resin (CELLOXIDE 2021P manufactured by Daicel Chemical Industries, Ltd.) (component B), 25 parts by weight of (3',4'-Epoxycyclohexane)methyl-3',4'-Epoxycyclohexyl-carboxylate (CELLOXIDE 2081 manufactured by Daicel Chemical Industries, Ltd.) (component C), and 1 part by weight of a 50% propione carbonate solution of 4,4'-bis[di(β-hydroxyethoxy)phenylsulfinio]phenylsulfide bishexafluoroantimonate (photoacid generator, Component D).

Material for Formation of Core

A material for formation of a core was prepared by dissolving 70 parts by weight of the aforementioned component A, 30 parts by weight of 1,3,3-tris{4-[2-(3-oxetanyl)]butoxyphenyl}butane and 0.5 part by weight of the aforementioned component D in 28 parts by weight of ethyl lactate.

Production of Optical Waveguide

The under-cladding layer material was applied on a glass substrate (having a thickness of 1.0 mm) by a spin coating method, and then dried at 100° C. for 15 minutes. Thus, a photosensitive resin layer was formed. In turn, the photosensitive resin layer was exposed to ultraviolet radiation at 2000 mJ/cm$^2$ via a synthetic quartz exposure mask formed with opening patterns respectively conformal to an under-cladding layer pattern and an alignment mark pattern, and then a heat treatment was performed at 100° C. for 30 minutes. Subsequently, a development process was performed by using a γ-butyrolactone aqueous solution to dissolve away an unexposed portion, and then a heat treatment was performed at 150° C. for 15 minutes, whereby an under-cladding layer and alignment marks (each having a thickness of 25 µm) were formed.

Then, a portion of the resultant substrate excluding the alignment marks and their peripheries was masked with a masking tape and, in this state, thin silver films (each having a thickness of 150 nm) were formed as covering upper surfaces and side surfaces of the alignment marks and portions of the glass substrate around the alignment marks by vacuum vapor deposition. Thereafter, the masking tape was removed.

Subsequently, the core material was applied on the resultant glass substrate as covering the under-cladding layer and the thin silver films by a spin coating method, and then dried at 100° C. for 15 minutes. Thus, a transparent photosensitive resin layer (having a thickness of 24 μm as measured on the under-cladding layer) was formed. In turn, a synthetic quartz exposure mask formed with an opening pattern conformal to a core pattern was positioned above the photosensitive resin layer with reference to the thin silver films, which were visually detectable through the photosensitive resin layer. After the photosensitive resin layer was exposed to ultraviolet radiation at 4000 mJ/cm$^2$ from above the mask by a contact exposure method, a heat treatment was performed at 100° C. for 15 minutes. Then, a development process was performed by using a γ-butyrolactone aqueous solution to dissolve away an unexposed portion, and then a heat treatment was performed at 150° C. for 30 minutes. Thus, a core was formed.

In turn, the over-cladding layer material was applied on the resultant glass substrate as covering the under-cladding layer, the thin silver films and the core by a spin coating method, and then dried at 100° C. for 15 minutes. Thus, a second transparent photosensitive resin layer (having a thickness of 35 μm as measured on the under-cladding layer) was formed. In turn, a synthetic quartz exposure mask formed with an opening pattern conformal to an over-cladding layer pattern was positioned above the second photosensitive resin layer with reference to the thin silver films, which were visually detectable through the second photosensitive resin layer. After the second photosensitive resin layer was exposed to ultraviolet radiation at 2000 mJ/cm$^2$ from above the mask by a contact exposure method, a heat treatment was performed at 100° C. for 30 minutes. Subsequently, a development process was performed by using a γ-butyrolactone aqueous solution to dissolve away an unexposed portion, and then a heat treatment was performed at 150° C. for 15 minutes. Thus, an over-cladding layer was formed.

In this manner, an optical waveguide including the under-cladding layer, the core and the over-cladding layer stacked in this order was produced on the glass substrate.

Comparative Example 1

An optical waveguide was produced in substantially the same manner as in Example 1, except that the thin silver films were not formed on the alignment marks and the photosensitive resin layer for the formation of the core and the second photosensitive resin layer for the formation of the over-cladding layer each had a thickness of 20 μm.

As a result, it was difficult to visually detect the alignment marks in Comparative Example 1. Therefore, a longer period of time was required for the positioning of the exposure mask for the formation of the core and the positioning of the exposure mask for the formation of the over-cladding layer than in Example 1.

Although specific forms of embodiments of the instant invention have been described above and illustrated in the accompanying drawings in order to be more clearly understood, the above description is made by way of examples and not as a limitation to the scope of the instant invention. It is contemplated that various modifications apparent to one of ordinary skill in the art could be made without departing from the scope of the invention which is to be determined by the following claims.

What is claimed is:

1. A method for producing an optical waveguide, comprising the steps of:
    forming an under-cladding layer and an alignment mark from the same material on a substrate;
    forming a thin metal film on the alignment mark;
    forming a first transparent photosensitive resin layer on the resultant substrate to cover the under-cladding layer and the thin metal film;
    positioning an exposure mask with reference to the thin metal film formed on the alignment mark; and
    selectively exposing a predetermined portion of the first photosensitive resin layer on the under-cladding layer via the exposure mask to form a core defined by the exposed portion of the first photosensitive resin layer.

2. The method as set forth in claim 1, further comprising the steps of:
    forming a second transparent photosensitive resin layer on the resultant substrate to cover the under-cladding layer, the thin metal film and the core after the formation of the core;
    positioning an over-cladding layer formation exposure mask with reference to the thin metal film formed on the alignment mark; and
    selectively exposing a predetermined portion of the second photosensitive resin layer on the under-cladding layer via the over-cladding layer formation exposure mask to form an over-cladding layer defined by the exposed portion of the second photosensitive resin layer.

3. The method as set forth in claim 1, wherein the thin metal film is formed of silver.

4. The method as set forth in claim 1, wherein the first photosensitive resin layer has a thickness not less than 20 μm.

5. The method as set forth in claim 1, wherein the second photosensitive resin layer has a thickness not less than 20 μm.

6. The method as set forth in claim 1, wherein the optical waveguide includes a light emitting element embedded therein.

* * * * *